Dec. 22, 1970     W. DITTRICH ET AL     3,548,685
VEHICLE ENGINE CONTROL MEANS

Filed Oct. 14, 1968     2 Sheets-Sheet 1

INVENTORS
Walter Dittrich
Jakob Konrad

INVENTORS
Walter Dittrich
Jakob Konrad

United States Patent Office 3,548,685
Patented Dec. 22, 1970

3,548,685
VEHICLE ENGINE CONTROL MEANS
Walter Dittrich, Nuremberg, and Jakob Konrad, Nuremberg-Reichelsdorf, Germany, assignors to Maschinenfabrik Augsburg-Nuremberg Aktiengesellschaft, Nuremberg, Germany
Filed Oct. 14, 1968, Ser. No. 767,319
Claims priority, application Germany, Oct. 28, 1967, 1,630,822
Int. Cl. B60k 21/00
U.S. Cl. 74—858          5 Claims

ABSTRACT OF THE DISCLOSURE

The drive shaft or gearshift of a vehicle is coupled to the engine fuel throttle valve so that the engine power is reduced for lower transmission ratios and vice versa.

---

This invention relates to an apparatus for powered vehicles having either a gearshift drive or an automatic drive. In particular, this apparatus is for the more advantageous use with regard to power and economy of the transmission in engine driven powered vehicles.

Powered vehicles and especially heavy trucks, trailer trucks and other commercial vehicles today need very heavy motors or engines in order to maintain a fluid traffic pattern so that the speed of the vehicle is not substantially diminished during a moderate climb and when in the upper gears. The use of heavy engines is supposed to prevent a noticeable average speed reduction and thus an interference to the adjacent traffic flow. On the other hand, it has been shown that the use of a correspondingly heavy engine develops the disadvantage that the driver has to make use of the full power of the engine and unnecessarily so even in the lower gears. This produces, in addition to high fuel consumption, a rapid rotation of the drive wheels because of the very high torque produced in the lower gears and further extreme wear and tear on the tires, a high stress on the drive, the universal joint, the differential and the rear axles. The layout and arrangement of the drives and the transmission for the full power of the engines in this class of increased power therefor require uneconomically large transmissions.

The object of this invention is to avoid the above disadvantages.

In general, this object is obtained by using an apparatus for restricting the highest torque on the driving axle of the vehicle dependent upon the relationship of the transmission ratio as shifted between the engine and the driven axle.

It is thus possible to use an oversized engine which permits greater speeds in the upper gears even when the vehicle is being driven uphill. However, with the higher rear axle speed, the torque given the identical engine power is relatively small or low so that the drive and transmissions of the powered vehicles which are currently used are completely sufficient. On the other hand, with a higher transmission ratio in the lower gears, the engine power given equal and identical capacity is limited to a smaller value so that the transmission cannot be damaged.

According to a further feature of this invention, the position of the gearshift lever is used as the controlling value for the limitation of the highest torque. For example, if the powered vehicle has a five-gear drive, then the apparatus of this invention takes care that when, for instance, the first, second, or even the third gear has been shifted the engine cannot run under full power. It is only in the fourth and fifth gears that the engine can run at full power. In another form of this invention, a torque sensing device arranged behind the drive gear is used as seen in the direction of the downdrive, and this sensing device is used as the control. This torque sensing device throttles the engine power when the torque in the various parts of the drive rises to high.

In a further feature of this invention, the operation is accomplished in practice in such a manner that the engine power is limited to an increasing degree dependent upon the ratio increase of the transmission gears as shifted and/or the increase of the torque behind the gearbox and determined by the torque sensing device. This is accomplished according to predetermined control laws which have been set up on a mathematical basis and/or on the basis of specific data obtained during driving tests.

Further, according to this invention, the controlling value factor presented by the gearshift lever or the torque sensing device has a gradual effect upon the element controlling the engine power as, for example, the control lever for a fuel injection pump or the carburetor throttle valve. For example, in first gear, the gearshift lever is connected by way of lost motion linkage with the fuel injection pump or throttle valve, which linkage includes a differential lever. This prevents the engine, at this point, from receiving the largest amount of injected fuel for full throttle. Suitable stops are used to make certain that in the second gear the amount of injected fuel or throttle setting is larger and still larger in the third gear. Any limitation is eliminated for the fourth or fifth gear. According to a further feature of this invention, it is possible to control the engine power by means of a control value in vehicles having a gearshift as well as those having automatic transmissions, and this is done by means of the control element of the torque sensing device or another controlling part of the drive. In the case of an automatic drive, the limitation of the amount of injected fuel or throttle setting is accomplished by way of a linkage from that controlling element which provides the automatic drive control as, for example, shifting of the gears or the adjustment of the guide baffles in a fluid drive. However, a torque sensing device can also be used to advantage in an automatic transmission for limiting the amount of injected fuel and especially when the control element for the automatic transmission is not accessible or only accessible with great difficulty.

It is of advantage in some cases to make the structural arrangement in such a way that only a normal and/or throttled power is used in the lower gears, or that in a reverse manner, a higher torque is supplied in the upper gears, that is, overpower for a short time. This is done, for example, in a simple way in that the gearshift lever opens a larger path from the control rod of the fuel injection pump in the upper gears.

The simplest way to obtain the object of this invention is by using an apparatus that is operated automatically by the gearshift lever and which changes the full load stop of the fuel injection pump into two steps. In this manner, it is possible to drive with two different engine powers as, for example, in the first to third gears with a normal engine power and in the fourth and fifth gears with an excessive engine power.

The means by which the objects of this invention are obtained are described more fully with reference to the accompanying schematic drawings in which:

FIG. 3b is an enlarged detail view of a portion of FIG. 3a, and

Figure 1:
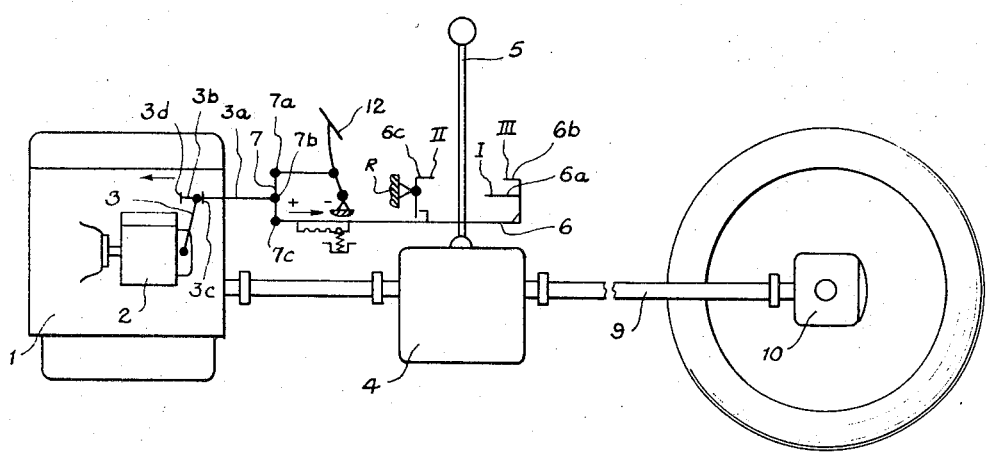
FIG. 1 is a side elevational view where the gearshift is used for controlling the engine power.
Figure 2:
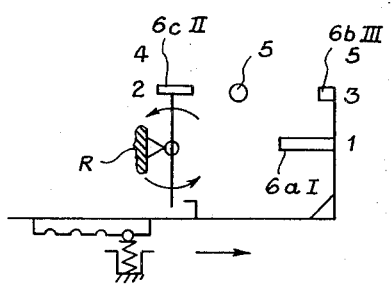
FIG. 2 is a top view of the limit stops used for the gearshift lever.

As shown in FIG. 1, the engine 1 has a fuel injection pump 2 which is controlled by a fuel throttle valve lever 3. This lever is connected to rod 3a. The transmission gearbox 4 is operated by the gearshift lever 5. This gearshift lever actuates the limit stop linkage 6 including the various long limit stops 6a, 6b and 6c. Stop 6c is at the same time provided with a reversing mechanism R which is schematically indicated in the drawing but not shown in practical detail. The limit stop linkage 6 is shown in top view in FIG. 2 on a slightly enlarged scale. The driver's accelerator foot pedal 12 is connected to a differential lever 7 through joint 7a and to linkage 6 through joint 7c. It is connected to rod 3a through joint 7b. Rod 3a is joined to lever 3 by a lost motion portion 3b extending between stops 3c and 3d.

Figure 3B:
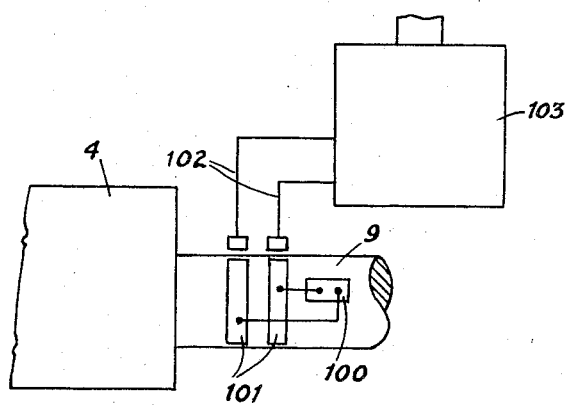
Figure 3:
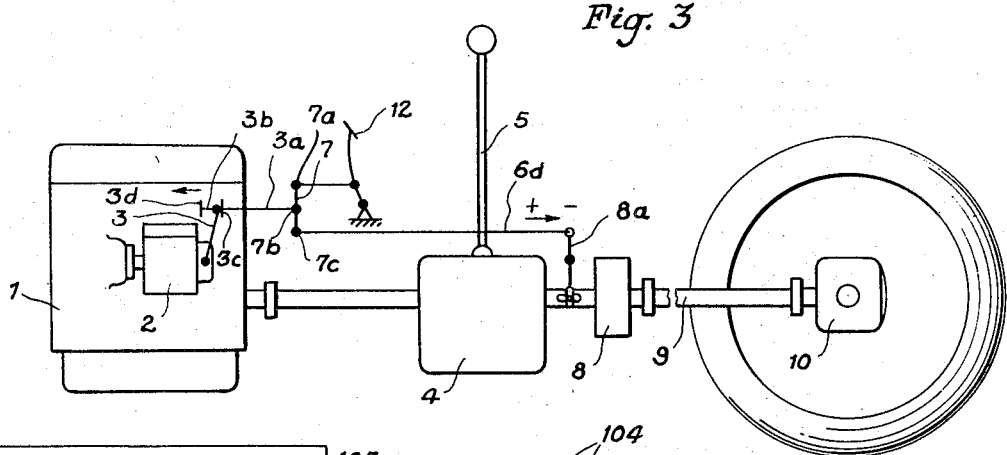
FIG. 3 is a side view of the engine using a torque sensing device.

The structural parts of FIG. 1 are reproduced in FIG. 3 with the same reference numerals and with the addition of a torque sensing device in place of the limit stop linkage operated by the gearshift lever 5. The torque sensing device 8 is connected to the drive shaft 9 for the rear axle assembly 10. The sensing device 8 operates a lever 8a connected to lever 6d which is connected through joint 7c to differential lever 7. This arrangement is for limiting in the lower gears, with their large reduction, the engine power by means of the gearshift lever 5 or the torque sensing device 8 while it remains unlimited in the upper gears. In other words, engine throttling takes place in the lower gears. The same effect can be achieved, however, when the engine power is throttled from the start by limiting the movement of the throttle valve lever and in the upper gears by cancelling this limitation through the gearshift lever 5 or the torque sensing device 8. In other words, the effect is achieved by a release in the upper gear range.

Figure 4:
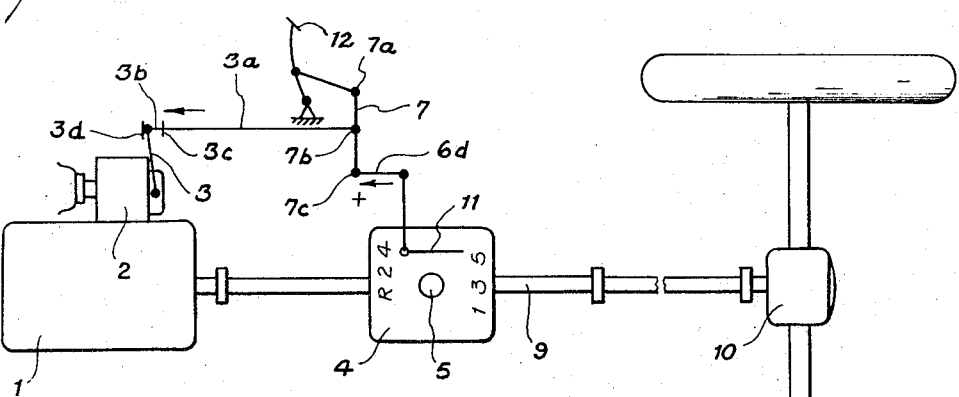
FIG. 4 is a view similar to FIG. 1 showing the apparatus for freeing the torque in the upper gears.

Such arrangement is schematically shown in FIG. 4 in which the lever linkage has been rotated 90° for purposes of clarity. The gearshift lever in this modification engages bell crank lever 11 which, through the linkage is connected to differential lever 7.

Figure 3A:
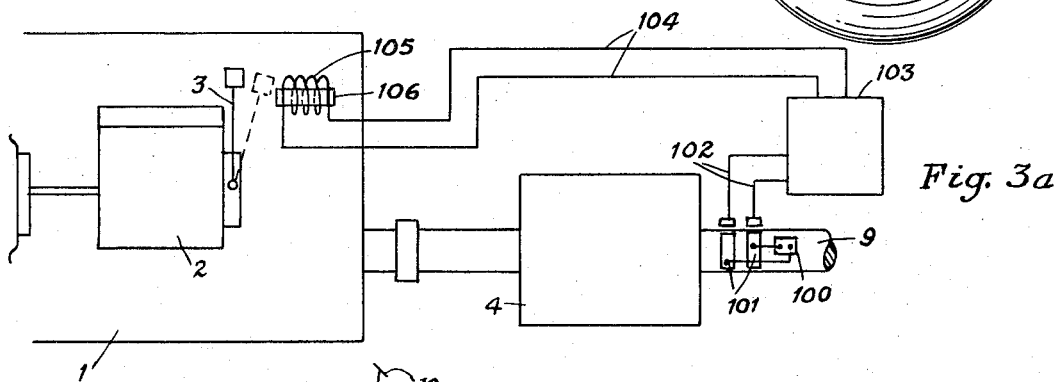
FIG. 3a is a schematic view of the torque sensing device of FIG. 3.

Sensing device 8 is shown in FIGS. 3a and 3b. Expansion measuring strip or strain gauge 100 is mounted on drive shaft 9 and communicates with an electrical collector 101 which in turn is joined by lines 102 to an amplifier 103. This amplifier is joined by lines 104 to a coil 105 around a magnet 106. A change of the electrical resistance in strip 100 due to a change in torque in shaft 9 energizes magnet 105 which then adjusts the lever 3 for the fuel injection pump 2.

(1) EFFECT BY MEANS OF THROTTLING IN THE LOWER GEARS

Referring to FIG. 1, when gearshift lever 5 is placed in first gear, then the gearshift lever pushes against the longest stop 6a at position I in the limit stop linkage 6. This moves the linkage to the right in the direction of the arrow and displaces joint 7c of the differential lever 7 counterclockwise around its free point of rotation. The rod 3a is thus moved with joint 7b to the right. The rod portion 3b is also moved with lost motion with respect to throttle valve lever 3 to the right until the upper end of lever 3 remains stationary until contacted by the stop 3d. When the driver steps on foot pedal 12 and displaces the same counterclockwise, he also displaces with this action the differential lever 7 counterclockwise.

The rod 3a through joint 7b is now displaced toward the left which, however, is at first without any effect on lever 3 due to the lost motion until it is contacted by stop 3c and moves lever 3 counterclockwise in the direction for full fuel injection in pump 2. A certain portion of the swinging movement of lever 3 has thus been lost to the driver. He can no longer inject the full amount of fuel and he does not have at his disposal the entire engine power and/or entire torque but, for example, only 60% of the full-load power. As soon as the driver now moves the gearshift into second gear, the gearshift lever 5 hits the stop 6c at position II. This stop is positioned so that the displacement of the limit stop linkage 6 in the direction toward the right is no longer as large as it was for first gear. Therefore, differential lever 7 is also not as much displaced against clockwise rotation as was the case with first gear. The upper end of lever 3 is now positioned between stops 3c and 3d. The driver, when he again steps on pedal 12, does not have to overcome as much lost motion as was the case with first gear. He can now move lever 3 through a larger angle and thus inject a larger amount of fuel. The driver now has at his disposal a larger engine power and/or torque and it amounts here to about 70% of the full power. In third gear, the stop 6b is of such size that the displacement path of linkage 6 to the right becomes even less at position III. Here the driver has at his disposal approximately 80% of the full power. There is no restriction at all in fourth and fifth gears, note FIG. 4. In these latter gears, the driver has at this disposal the full 100% power for the rapid climbing of a hill or for overtaking slower traffic.

(2) AUTOMATIC LIMITATION OF THE ENGINE POWER BY MEANS OF A TORQUE SENSING DEVICE

As shown in FIG. 3, the displacement of the limit stop linkage 6 to the right is accomplished by the lever 8a for the torque sensing device 8. The lower the shifted gear is, the larger is the torque behind the gear and the longer is the displacement to the right of rod 6d of the limit stop linkage. However, as heretofore described, the amount of injected fuel is so reduced and therefor the power delivered by the engine is also reduced in the same way.

(3) EFFECT BY THE RELEASE IN THE UPPER GEARS

As shown in FIG. 4 and as seen in the forward movement direction of the vehicle, there is provided on the right adjacent the gearshift lever 5 a bell crank 11 in the control plane which, when the fourth and fifth gears are shifted, is therefor displaced to the left in the direction of the arrow. Differential lever 7 is in this case moved clockwise. The stop 3c moves to engage the end of lever 3 for the fuel injection pump. As soon as the driver steps on foot pedal 12, differential lever 7 moves counterclockwise around joint 7c. Since there is now no lost motion, the driver can inject the full amount of fuel by means of pedal 12. Thus the driver has the entire torque at his disposal in the fourth and fifth gears.

The following table shows the advantages of this invention as it gives the engine power when limited and when not limited.

| Reduction | Therefore torque behind the drive— | |
|---|---|---|
| | Limited | Unlimited |
| First gear 1:7 | 280 | |
| Second gear 1:5 | 200 | |
| Third gear 1:3 | | 180 |
| Fourth gear 1:2 | | 120 |
| Fifth gear 1:1 | | 60 |

The driving axle is conventionally constructed for a drive and an engine having the highest power at 290M kp.

As can be seen from the table, if the conventional driving axle without any limitation on the torque were to be overloaded in the first and second gears, then this would cause high wear and tear and also a danger of breakage. However, without any such limitation in the lower gears, a driving axle of excessive size and very uneconomical would have to be used.

The system of this invention can also be used to limit the discharge of poisonous and corrosive contents of the exhaust gas instead of reducing the stress on the drive parts, as the case may be.

Having now described the means by which the objects of this invention are obtained,

We claim:

1. In combination with a powered vehicle comprising an engine, a fuel pump connected to said engine, a wheel driving axle, a drive shaft between said engine and said axle, a gear transmission joined to said drive shaft between said engine and said axle, and apparatus means for limiting the highest torque on said axle as a function of the transmission ratio, said apparatus means comprising a torque sensor mounted on said drive shaft between said transmission and said axle, and coupling means between said sensor and said fuel pump for controlling said pump.

2. In the combination of claim 1, said apparatus means being for restricting the engine capacity as the transmission ratio is increased between said transmission and said axle.

3. In the combination of claim 2, said engine having a fuel throttle valve lever (3), and lever means linking said throttle valve lever to said torque sensing device for gradually adjusting the power of the engine.

4. In the combination of claim 1, said apparatus means including adjusting member means (8a) for controlling the power of the engine.

5. In the combination of claim 1, said apparatus means producing a normal or reduced power for lower transmission ratios, and increased power for higher transmission ratios.

References Cited

UNITED STATES PATENTS

| 1,815,772 | 7/1931 | Gray | 74—879 |
| 2,229,345 | 1/1941 | Schotz | 74—877X |
| 3,059,495 | 10/1962 | Granrid | 74—877 |

ARTHUR T. McKEON, Primary Examiner

U.S. Cl. X.R.

74—877